United States Patent
Burger et al.

(10) Patent No.: US 8,127,119 B2
(45) Date of Patent: Feb. 28, 2012

(54) CONTROL-FLOW PREDICTION USING MULTIPLE INDEPENDENT PREDICTORS

(75) Inventors: Doug Burger, Austin, TX (US); Stephen W. Keckler, Austin, TX (US); Nitya Ranganathan, Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 292 days.

(21) Appl. No.: 12/329,517

(22) Filed: Dec. 5, 2008

(65) Prior Publication Data

US 2010/0146249 A1   Jun. 10, 2010

(51) Int. Cl.
  G06F 7/38   (2006.01)
  G06F 9/00   (2006.01)
  G06F 9/44   (2006.01)
  G06F 15/00  (2006.01)

(52) U.S. Cl. .................................. 712/239; 712/240
(58) Field of Classification Search .................. None
  See application file for complete search history.

(56) References Cited

U.S. PATENT DOCUMENTS

2008/0109637 A1* 5/2008 Martinez et al. ............... 712/29

OTHER PUBLICATIONS

Parcerisa; Design of Clustered Superscalar Microarchitectures—Chapter 7; Thesis, 2004.*
Ipek et al.; Core Fusion: Accomodating Software Diversity in Chip Multiprocessors; Jun. 2007; ISCA '07.*
Mai, Ken et al., "Smart Memories: A Modular Reconfigurable Architecture" *ISCA* Jun. 2000.
Huh, Jaehyuk et al., "A NUCA Substrate for Flexible CMP Cache Sharing", IEEE Transactions on Parallel and Distributed Systems, vol. 18, No. 8, pp. 1028-1040, Jun. 2007.
Sohi, Gurindar S. et al., "High-Bandwidth Data Memory System for Superscalar Processors", IEEE-CS, vol. 25, pp. 53-62, Apr. 1991.
Wilson, Kenneth M. et al., (1997) "Designing High Bandwidth On-Chip Caches", ISCA, pp. 121, 24th Annual International Symposium on Computer Architecture.

* cited by examiner

*Primary Examiner* — Corey S Faherty
(74) *Attorney, Agent, or Firm* — Dorsey & Whitney LLP

(57) ABSTRACT

The present disclosure generally describes computing systems with a multi-core processor comprising one or more branch predictor arrangements. The branch predictor are configured to predict a single and complete flow of program instructions associated therewith and to be performed on at least one processor core of the computing system. Overall processor performance and physical scalability may be improved by the described methods.

15 Claims, 8 Drawing Sheets

CONTROL-FLOW PREDICTION USING MULTIPLE INDEPENDENT PREDICTORS

STATEMENT REGARDING GOVERNMENT SPONSORED RESEARCH

The invention was made with government support under F33615-03-C-4106 awarded by the Air Force. Thus, the U.S. Government has certain rights to the invention.

BACKGROUND

In a computer architecture, a branch predictor is a component or a portion of a processor that determines whether a conditional branch in the instruction flow of a program is likely to be taken or not taken. This is called branch prediction. Branch predictors are important for today's modern, superscalar processors for achieving high performance. Such arrangements facilitate processors to fetch and execute instructions without waiting for a branch to be resolved. Most pipelined processors perform some type of branch prediction as they can guess the address of the next instruction to fetch before the current instruction has been executed.

Branch predictors may be local or global, and can be separate devices and/or part of processors and/or cores. Local branch predictors generally maintain two tables of two-bit entries. For example, the first table is the local branch history table. Such table is indexed by the low-order bits of each branch instruction's address, and it can record the taken/not-taken history of the n-most recent executions of the branch. The other table can be the pattern history table. This table contains bimodal counters, and its index may be generated from the branch history in the first table. To predict a branch, the branch history is looked up, and that history is then used to look up a bimodal counter which makes a prediction.

Global branch predictors make use of the fact that the behavior of many branches is strongly correlated with the history of other recently taken branches. For example, a single shift register can be updated with the recent history of every branch executed, and this value may be used to index into a table of bimodal counters. Generally, global branch prediction may be less accurate than the local prediction.

Conventional branch predictors may consist of multiple distinct types of predictors. In particular, this can be some combination of local and global predictors. However, under a conventional architecture, each distinct predictor generally makes a prediction for every branch, and then the aggregate predictor selects from among the various predictions.

In the expected later-developed distributed architectures, it may be that a variable number of processors can collaborate to accelerate single programs. In that case, one problem that may need to be addressed is how the predictions are made to keep many instructions in flight among all of the participating processors. These participating processors may, at some time, collude to accelerate one program, and, at other times, execute separate, distinct programs. In the latter mode, it may be important for each of the processors to have their own predictor for the independent jobs they are executing.

One possible solution to the above described problem that has been the subject of the current research is to designate one of the participating processors to be the "master processor", which is responsible for making all of the predictions. In such case, all of the other participating processors' branch predictors would be unused. This case could create two unappealing solutions. In one case, e.g., the predictor is made large enough to drive the predictions for the large configuration in which many processors are participating, and many instructions are in flight. In that case, the predictor is too large (and therefore potentially slow) for when the processors are running in "independent" mode, with their own respective software tasks. In the other case, the predictor is tuned for independent mode, and is therefore smaller, but in that case it is undersized for "collaborative" mode.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
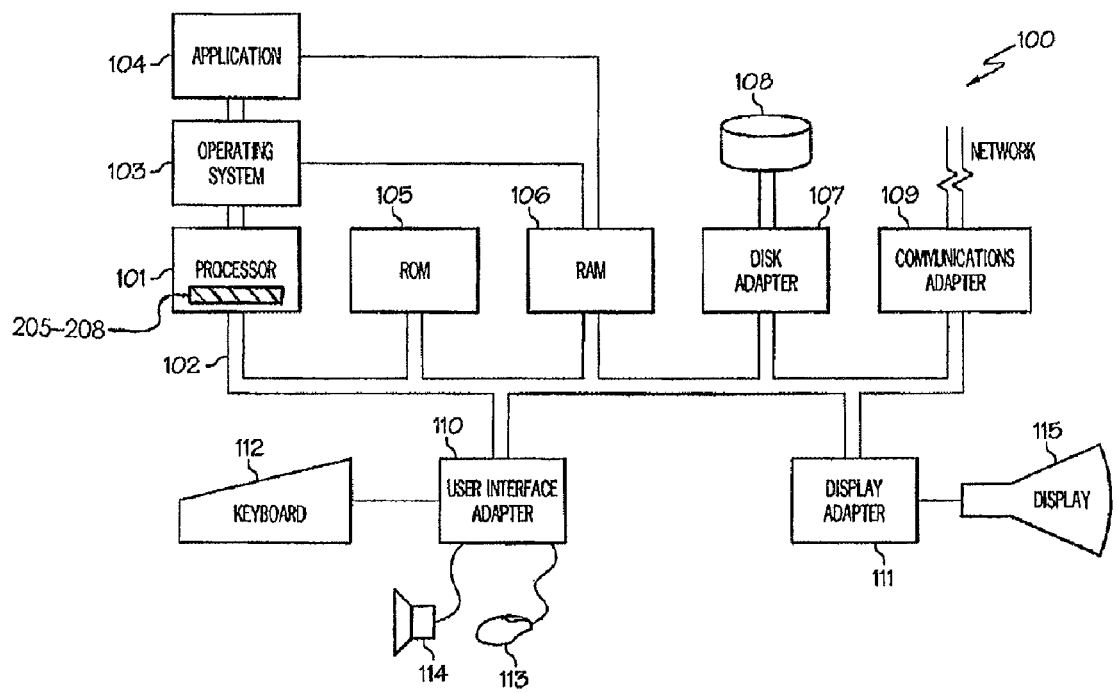
FIG. 1 is a schematic illustration of a block diagram of a computing system arranged in accordance with some examples.

In the following detailed description, reference is made to the accompanying drawings, which form a part hereof In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn to methods, apparatus, computer programs and systems related to branch prediction. Certain preferred embodiments of one such system are illustrated in the figures and described below. Many other embodiments are also possible, however, time and space limitations prevent including an exhaustive list of those embodiments in one document. Accordingly, other embodiments within the scope of the claims will become apparent to those skilled in the art from the teachings of this patent.

Briefly stated, the present disclosure generally describes computing systems with a multi-core processor comprising one or more branch predictor arrangements. The branch predictor are configured to predict a single and complete flow of program instructions associated therewith and to be performed on at least one processor core of the computing system. Overall processor performance and physical scalability may be improved by the described methods.

The figures include numbering to designate illustrative components of examples shown within the drawings, including the following: a computer system 100, a processor 101, a system bus 102, an operating system 103, an application 104, a read-only memory 105, a random access memory 106, a disk adapter 107, a disk unit 108, a communications adapter 109, an interface adapter 110, a display adapter 111, a keyboard 112, a mouse 113, a speaker 114, a display monitor 115, an instruction data flow 170, a plurality of heterogeneous processor cores 201-204, branch predictors 205-208, conditional branches 209-212, a hash function 213, a global history table 215, and a predicted address 217.

FIG. 1 is a schematic illustration of a block diagram of a computing system 100 arranged in accordance with some examples. Computer system 100 is also representative of a hardware environment for the present disclosure. For example, computer system 100 may have a processor 101 coupled to various other components by a system bus 102. Processor 101 may be a heterogeneous multi-core processor with a plurality of branch predictors 205-208 arranged in accordance with the examples herein. A more detailed description of processor 101 is provided below in connection with a description of the example shown in FIG. 2. Referring to FIG. 1, an operating system 103 may run on processor 101, and provide control and coordinate the functions of the various components of FIG. 1. An application 104 in accordance with the principles of examples of the present disclosure may execute in conjunction with operating system 103, and provide calls and/or instructions to operating system 103 where the calls/instructions implement the various functions or services to be performed by application 104.

Referring to FIG. 1, a read-only memory ("ROM") 105 may be coupled to system bus 102, and can include a basic input/output system ("BIOS") that can control certain basic functions of computer device 100. A random access memory ("RAM") 106 and a disk adapter 107 may also be coupled to system bus 102. It should be noted that software components, including operating system 103 and application 104, may be loaded into RAM 106, which may be computer system's 100 main memory for execution. A disk adapter 107 may be provided which can be an integrated drive electronics ("IDE") or parallel advanced technology attachment ("PATA") adapter, a serial advanced technology attachment ("SATA") adapter, a small computer system interface ("SCSI") adapter, a universal serial bus ("USB") adapter, an IEEE 1394 adaptor, or any other appropriate adapter that communicates with a disk unit 108, e.g., disk drive.

Referring to FIG. 1, computer system 100 may further include a communications adapter 109 coupled to bus 102. Communications adapter 109 may interconnect bus 102 with an external network (not shown) thereby facilitating computer system 100 to communicate with other similar and/or different devices.

Input/Output ("I/O") devices may also be connected to computer system 100 via a user interface adapter 110 and a display adapter 111. For example, a keyboard 112, a mouse 113 and a speaker 114 may be interconnected to bus 102 through user interface adapter 110. Data may be provided to computer system 100 through any of these example devices. A display monitor 115 may be connected to system bus 102 by display adapter 111. In this example manner, a user can provide data or other information to computer system 100 through keyboard 112 and/or mouse 113, and obtain output from computer system 100 via display 115 and/or speaker 114.

The various aspects, features, embodiments or implementations of examples of the present disclosure described herein can be used alone or in various combinations. The method examples of the present disclosure can be implemented by software, hardware or a combination of hardware and software (e.g., software stored on a computer-accessible medium).

Figure 2:
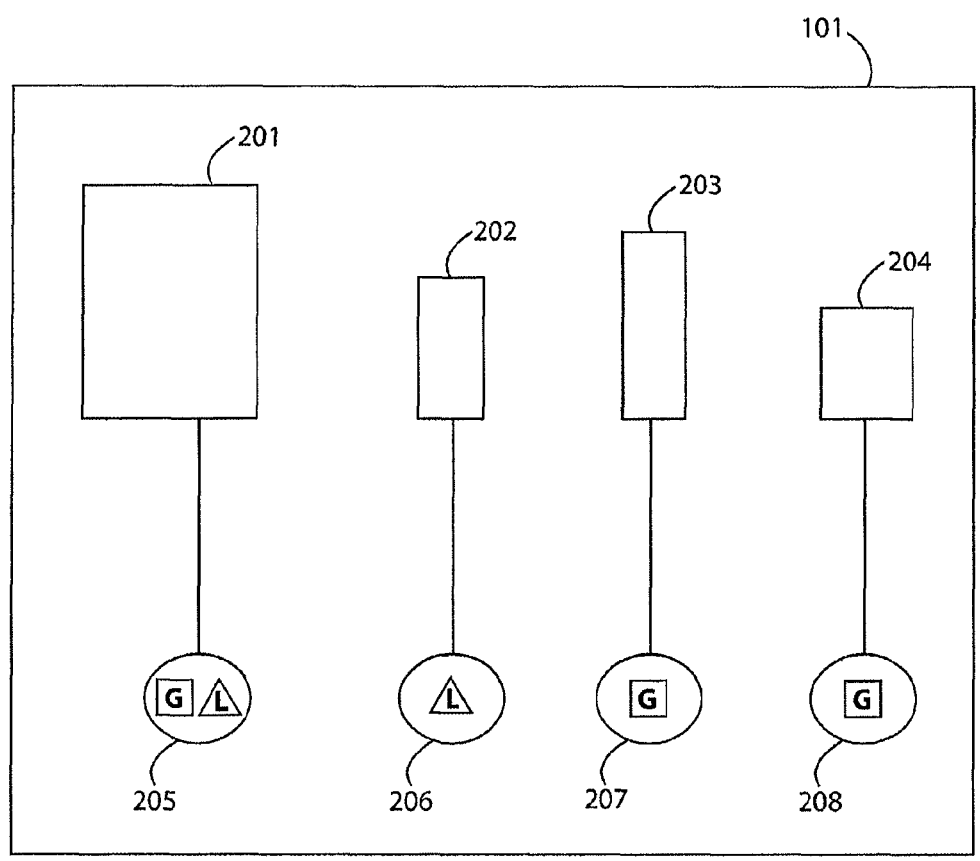
FIG. 2 is a schematic illustration of a block diagram of a processor in accordance with some examples.

FIG. 2 is a schematic illustration of a block diagram of a processor in accordance with some examples. Referring to FIG. 2, processor 101 is depicted according to an illustrative example. Within processor 101, a plurality of heterogeneous processor cores 201-204 can be provided, which each may have different sizes, performance capabilities, and hardware attributes. For simplicity of illustration, four heterogeneous processor cores 201-204 are depicted in FIG. 2, although it is to be appreciated that any number of processor cores may be included. For example, processor core 201 is depicted larger than the other cores, illustrating that it can have a higher performance capability than the other processor cores 202-204.

Associated with each of processor cores 201-204 is a respective one of branch predictors 205-208. As discussed above, branch predictors 205-208 may be local predictors (L), global predictors (G), or any combination of distinct local and/or global predictors. For example, branch predictor 205 is shown within FIG. 2 as having a combination of a local predictor (L) and a global predictor (G). Alternatively, branch predictor 206 is shown as having a local predictor (L).

Figure 3:
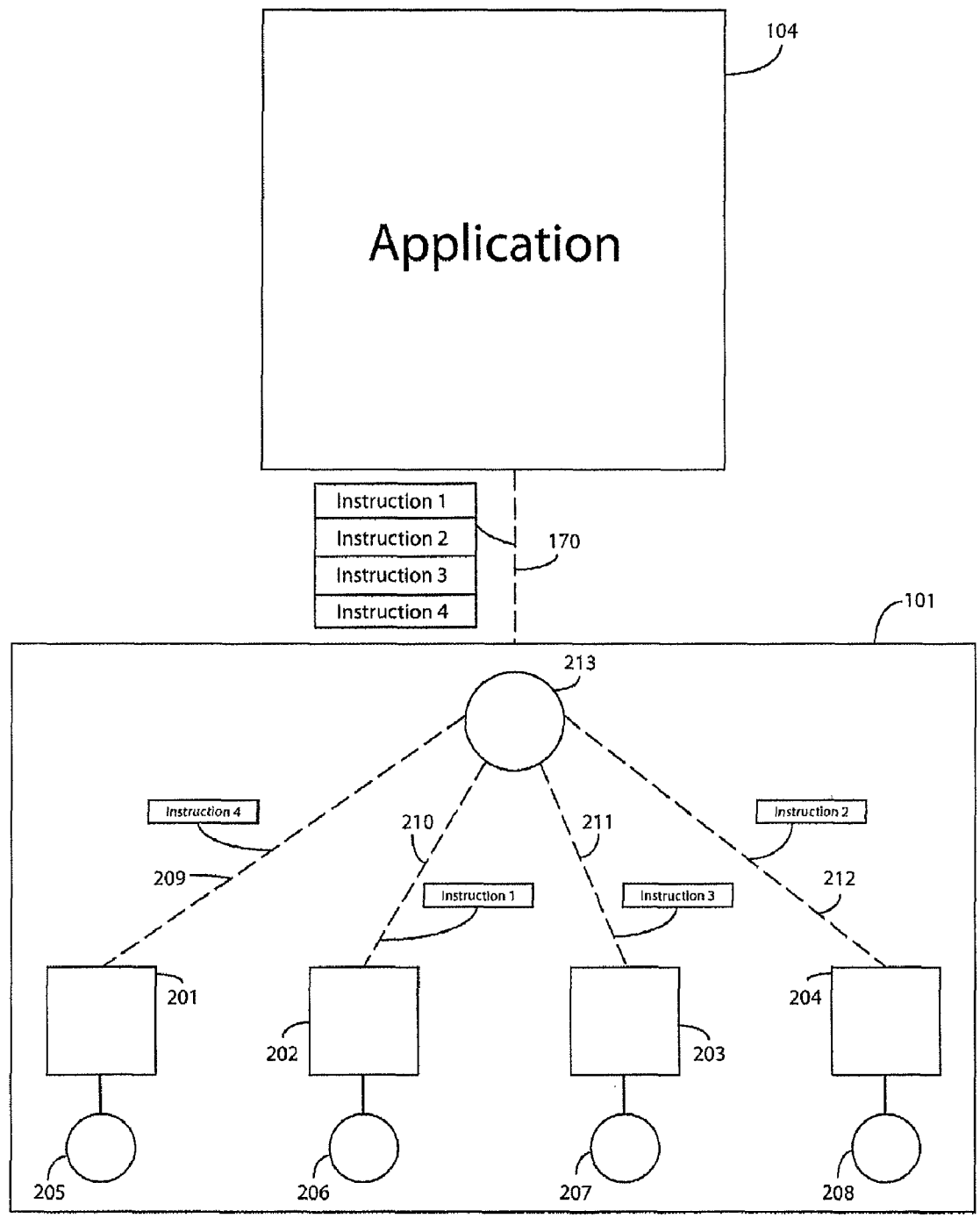
FIG. 3 is a schematic illustration of a block diagram of a prediction scheme in accordance with some examples.

FIG. 3 is a schematic illustration of a block diagram of a prediction scheme in accordance with some examples. FIG. 3 also illustrates a flow diagram as will be described. Each of processor cores 201-204 within processor 101 is configured to execute a computer software instruction data flow 170 from application 104. This instruction data flow 170 may include conditional branches 209-212. Each of conditional branches 209-212 can represent a point in application 104 where the flow of control may be altered. In particular, this example of the prediction scheme can be configured for a computing environment, where application 104 can have a block-based instruction set architecture. For example, each prediction can represent an individual block, each of which generates one branch (exit) to the next block (as opposed to predicting individual branches). Application 104 may be a program written in machine code, assembly language, or a high-level programming language. In the case of a high-level programming language, branches can take the form of conditional statements, subroutine calls, or GOTO statements. An instruction that causes a branch, i.e., a branch instruction, can be taken or not taken. For example, if a branch is not taken, the flow of control is likely unchanged, and the next instruction to be executed is the instruction immediately following the current instruction in memory. If the branch is taken, the next instruction to be executed is an instruction at some other place in memory or in another storage device.

As discussed herein, each of conditional branches 209-212 can be mapped to the respective one of processor cores 201-204 using, e.g., a hash function 213. Hash function 213 can be a well-defined procedure or mathematical function which converts a large, possibly variable-sized amount of data into smaller data, e.g., one or more single integers that may serve as an index into an array. The values returned by hash function 213 may be called hash values, hash codes, hash sums, hashes, etc. When a conditional branch is mapped to a respective processor core, it can be consequently predicted by the associated branch predictor. Thus, by mapping each of conditional branches 209-212 to the respective one of processor cores 201-204, each of branch predictors 205-208 is likely responsible for only a subset of the overall branches that application 104 can issue over the course of its execution.

After a particular one of conditional branches 209-212 has been mapped to the respective one of processor cores 201-204 using hash function 213, a prediction can be produced. As discussed herein, in a block-based instruction set architecture, these predictions can represent individual blocks, each of which possibly generating one branch to the next block.

Figure 4:
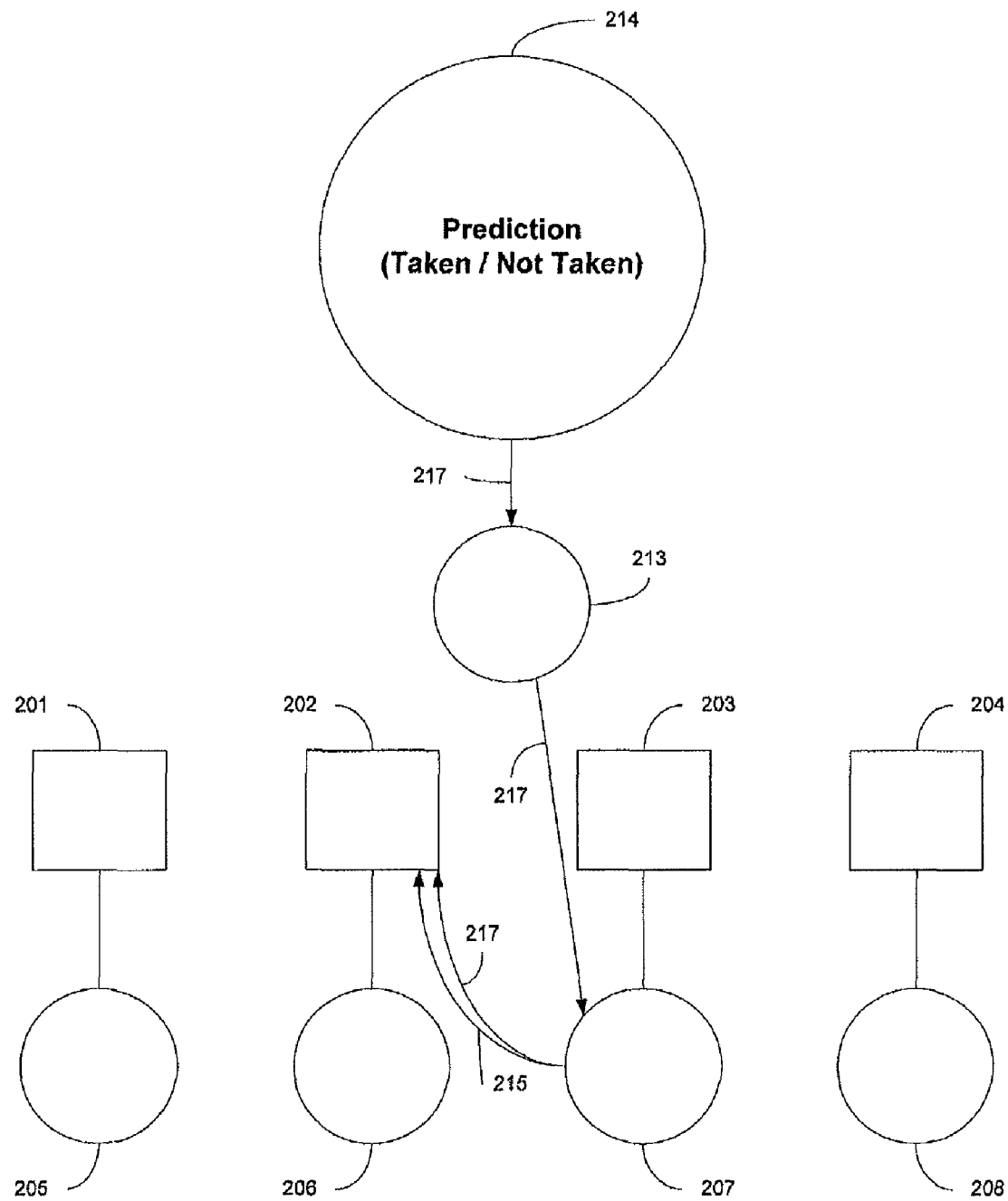
FIG. 4 is a schematic illustration of a block diagram of the prediction scheme in accordance with some additional examples.

FIG. 4 is a schematic illustration of a block diagram of the prediction scheme in accordance with some additional examples. Referring to FIG. 4, when a prediction 214 issues, a predicted address 217 is mapped to one of branch predictors 205-208 using hash function 213. For example, the predicted address 217 can be mapped to branch predictor 207. Then, a recent branch history table 215 of that predictor and predicted address 217 may be routed to the particular one of processor cores 201-204 that had previously been assigned the branch associated with the predicted address 217, e.g., shown as being routed to processor core 202. The size of recent branch history table may be equal to the depth of the history tracked multiplied by the number of bits per history entry. The particular one of the processors can receive the state data, and may use such data to issue subsequent branch predictions. Thus, the plurality of branch predictors 205-208 can act as a single logical predictor, which can have the effect of improving the processor performance while also improving the physical scalability of processor 101.

Figure 5:
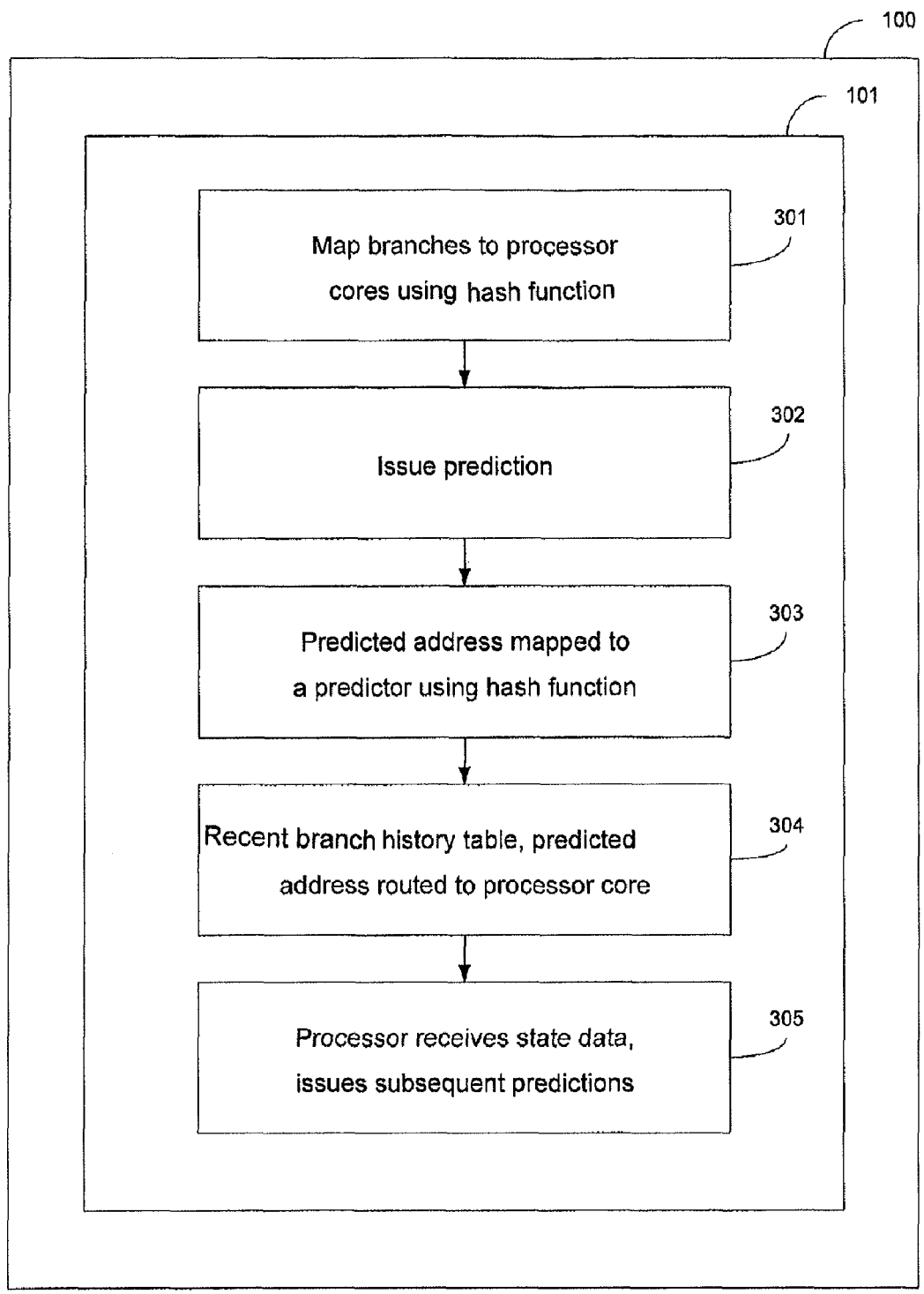
FIG. 5 is a flow and block diagram illustrative of example systems and methods.

FIG. 5 is a flow and block diagram illustrative of example systems and methods arranged in accordance with the present disclosure. As discussed herein, computer system 100 includes processor 101, on which the example procedures as described may be executed. In particular, conditional branches (e.g., branches 209-212) can be mapped to the respective one of a plurality of processor cores (e.g., 201-204) using a hash function (e.g., 213). For example, procedure 301 is arranged to map branches to processor cores using a hash function. Next, at procedure 302, the respective branch predictor associated (e.g., one of predictors 205-208) with one of the plurality of processor cores can issue a prediction, which can include or be an address to a particular block of code (e.g., a block-based instruction set architecture). Then, at procedure 303, after a prediction has been issued, the predicted address is mapped to a predictor (e.g., a particular one of the plurality of predictors) using the hash function. Next at procedure 304, the recent branch history table (e.g., 215, which corresponds to a specific predictor), and the previously predicted address (e.g., 217) are routed to the processor core (e.g., the specific processor core that had been assigned the block associated with the predicted address). In some examples, predictors 205-208 and processor cores 201-204 may be co-located, while in other examples, the predictors 205-208 and processor cores 201-204 may be located at different locations on the multi-core processor 101. Further, at procedure 305, the processor receives state data, and issues subsequent predictions based on the received state data. Further, the above example may be repeated throughout the execution of the application program (procedures 301-305).

Figure 6A:
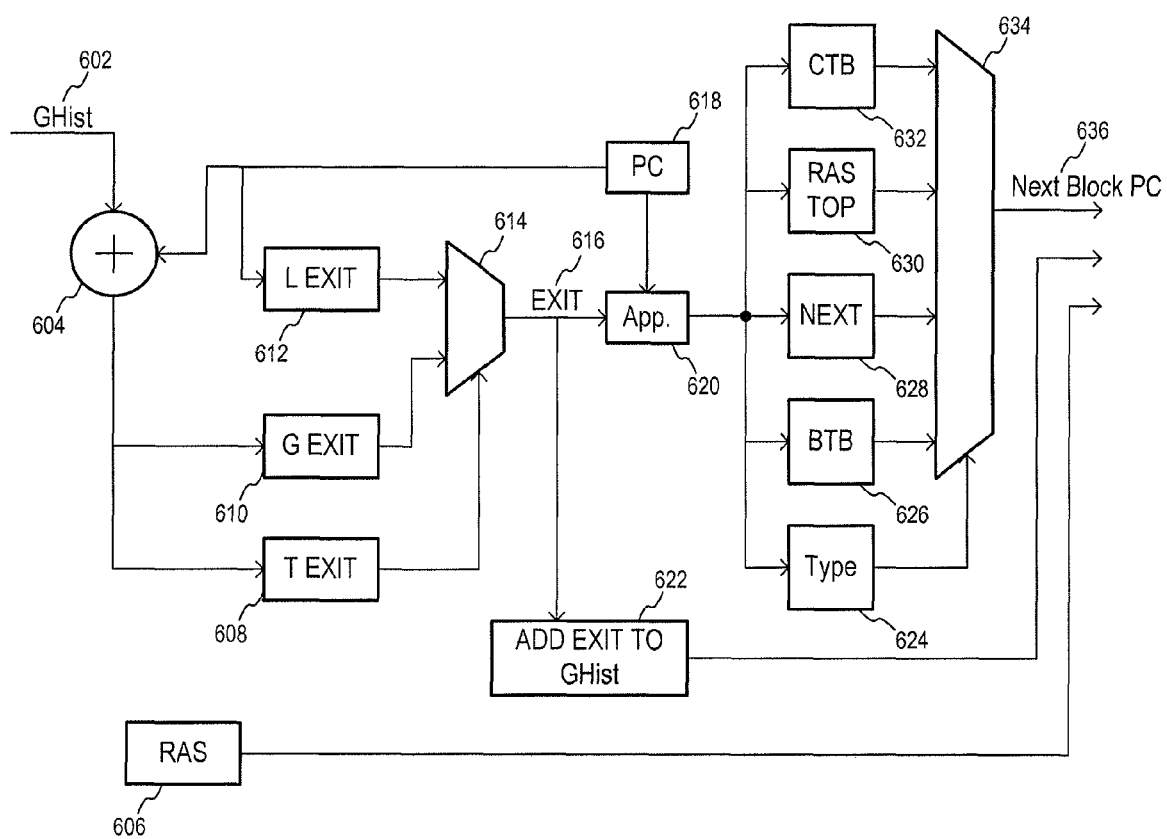
FIG. 6a is a schematic illustration of a block diagram of a predictor design in accordance with some examples.

FIG. 6a shows a schematic illustration of a block diagram of a predictor design in accordance with some examples. For example, a global history ("GHist") data 602 may be combined with a program counter ("PC") value 618 at a summer block 604, resulting in a combined data. Local ("L") exit 612 data may be obtained from program counter 618, while global ("G") exit 610 data may be obtained from the output of block 604. In some examples, a tournament ("T") predictor 608 may also receive data from block 604, and make a selection between local exit 612 and global exit 610 at multiplexor block 614, resulting in exit data 616. Exit data 616 may be added to the global history data 602, resulting in updated global history data 622 that may then be used to make subsequent predictions.

Exit data 616 may also be appended with the program counter value 618 at a block 620. When appended, such data may take the form of a plurality of different types of branches, for example, a call target buffer ("CTB") 632, a return address stack ("RAS") top 630, a next sequential branch ("NEXT") 628, and/or a branch target buffer ("BTB") 626. Type data 624 may select among the plurality of types of branches at a multiplexor block 634. This selection may be represented in the form of a predictor data 636. Predictor data 636, updated global history data 622, and/or a return address stack value 606 (which may indicate the location of the top of the RAS) may then be used in subsequent predictions.

In some examples, RAS top 630 and RAS value 606 may be derived from the same logical RAS. The RAS may be interleaved across some or all of the processor cores 201-204 on the multi-core processor 101. In these examples, when a new address is added to the stack, the particular processor core that predicts the corresponding branch may send an address to the particular processor core where the current RAS top 630 is located.

Figure 6B:
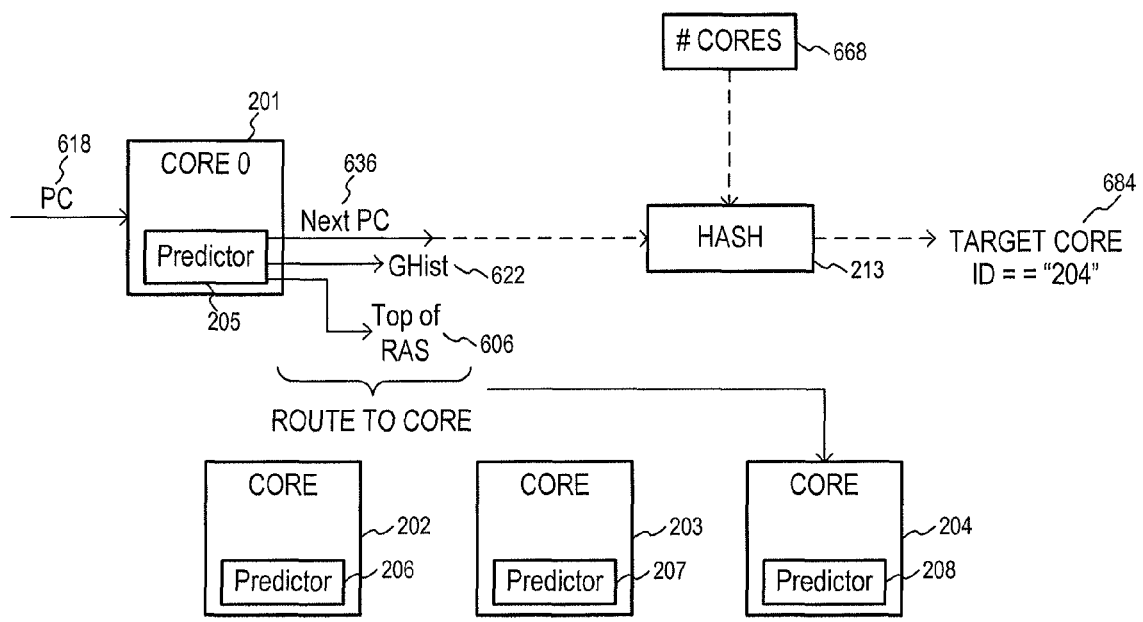
FIG. 6b is a schematic illustration of a block diagram of a prediction scheme as implemented on an example multi-core processor.

FIG. 6b show a schematic illustration of a block diagram of an example of a prediction scheme as implemented on an example multi-core processor, and should be discussed in conjunction with FIG. 6a. For example, the example multi-core processor may have four cores 201-204. Predictor(s) 205-208 can be associated with each core 201-204 with design characteristics as described above with reference to FIG. 6a. A value of program counter 618 is shown in FIG. 6b in connection with, for example, processor core 201 and predictor 205. As has been described in more detail above in connection with FIG. 6a, e.g., predictor 205 may generate predictor data 636, updated global history data 622, and/or return address stack value 606. To make subsequent predictions with such data, next block program counter value 636 may be routed to a hash function 213, which also may have a number of cores data 668. The hash function 213 can then generate a target core data 684, whereas the data from the previous prediction may be routed, for example, to core 204. Subsequently, core 204 may generate data (e.g., data 636, 622, and/or 606), which may then be routed to another core, as further branch instructions can be executed on or using the other core.

Figure 7:
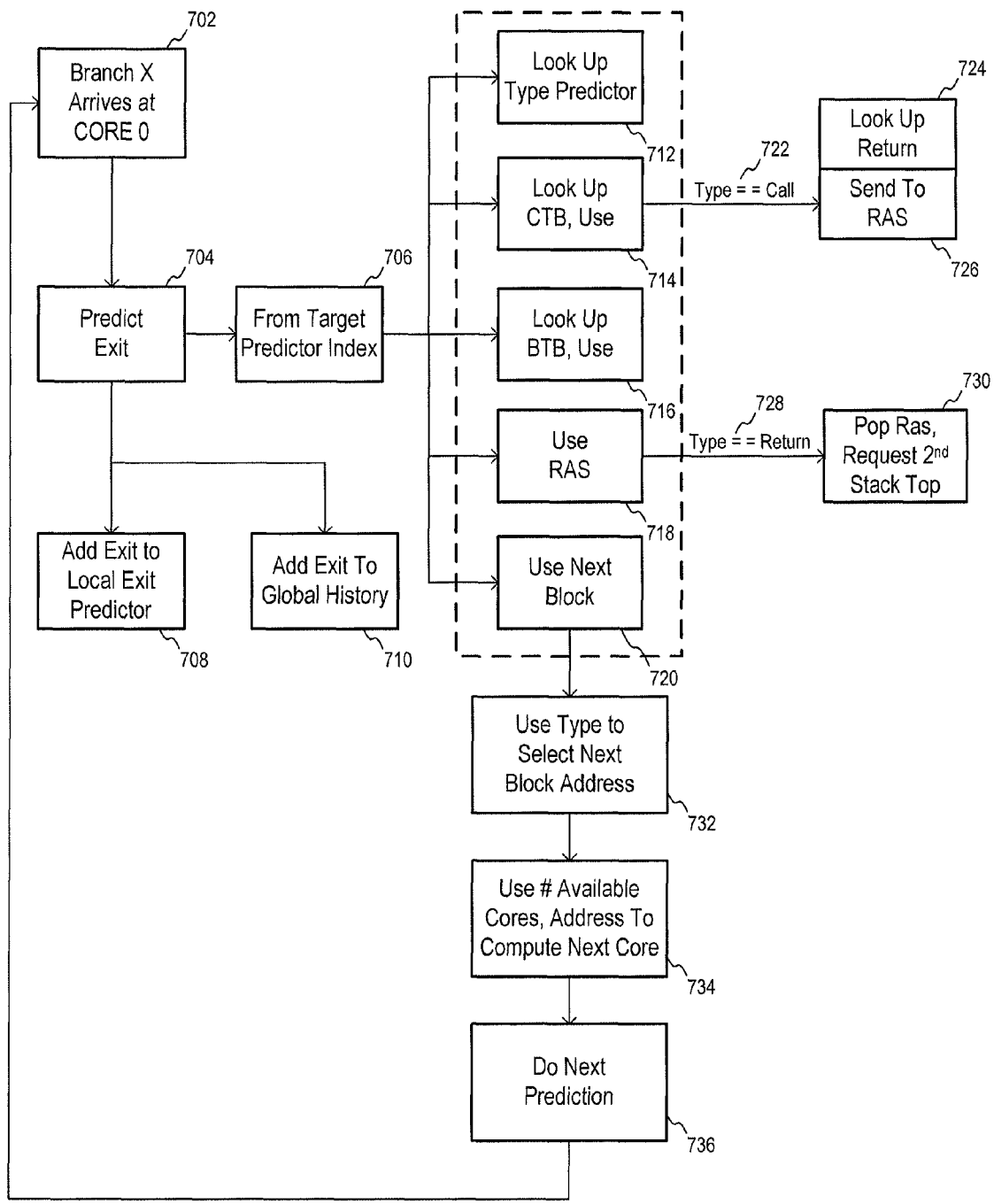
FIG. 7 is a flow and block diagram illustrative of example systems and methods arranged to execute the procedures that may be stored as computer instructions on computer-accessible medium, all arranged in accordance with the present disclosure.

FIG. 7 is a flow and block diagram illustrative of example systems and methods arranged to execute the procedures that may be stored as computer instructions on computer-accessible medium. For example, at procedure 702 (Branch X Arrives at Core O), a branch instruction may arrive at a core within the multi-core processor. Then, at procedure 704 (Predict Exit), an exit can be predicted. The exit may be added to the local exit predictor at procedure 708 (Add Exit to Local Exit Predictor), and the branch exit can be added to the global exit predictor at procedure 710 (Add Exit to Global History). A target predictor index may be generated to a plurality of different types of branches at procedure 706 (From Target Predictor Index). From this index, the system can be executed or configured to then look up a plurality of different types of branches, for example, CTB at procedure 714 (Look up CTB, Use), BTB at procedure 716 (Look up BTB, use), RAS at procedure 718 (Use RAS), and/or NEXT at procedure 720

(Use Next block). The type data may then be looked up at procedure 712 (Look up Type Predictor), and used to select among the plurality of different types of branches at procedure 732 (Use Type to Select Next Block Address), thus likely obtaining the corresponding next block address. Such data may be used by the hash function to determine the next owner core at procedure 734 (Use # Available Cores, Address to Compute Next Core), and then the example technique may be repeated, starting with a new prediction at procedure 736 (Do Next Prediction) and returned to procedure 702.

In some examples, additional procedures may be performed to update the RAS. For example, when a CTB branch type is selected (e.g., the type=call), such data may be transmitted to the RAS at procedure 726 (Send To RAS). Then, a return value may be looked up, and the RAS updated, at procedure 724 (Look Up Return). Alternatively, when a RAS branch type is selected (e.g., the type=return), then such data may "pop" (e.g., discard) the top of the RAS data, and the new RAS data may be added at procedure 730 (Pop RAS Request $2^{nd}$ Stack Top).

Disclosed in some examples are multi-core processor computing systems comprising a branch predictor arrangement which is configured to predict a single and complete flow of program instructions associated therewith to be performed on at least one processor core of the multi-core processor computing system. In some examples, the branch predictor arrangement may be provided in the processors cores. In other examples, the branch predictor arrangement may be configured to map and control branches in the respective flow of program instructions to at least one of the at least one processor core using a hash function. In further examples, the branch predictor arrangement may be configured to update each of the at least one processor core with a state information when a prediction is generated regarding a branch of the program instructions that has been mapped to such processor core. In some other examples, the state information may comprise a predicted address for the at least one processor core and a global history vector. In still further examples, the program instructions may have a block based instruction set architecture which comprise a plurality of blocks of instructions, and wherein when the branch predictors predict a branch of the instructions, the prediction provides a branch from one of the blocks to another one of the blocks. In further examples, the branch predictor arrangement is configured to predict a particular subset of branches in the flow of the program instructions.

Disclosed in further examples are methods for branch prediction in a multi-core processor computing system which may comprise the steps of mapping one or more branches of a flow of program instructions to at least one processor core in the multi-core processor computing system and generating a prediction regarding a placement of the one or more branches using a branch predictor arrangement. In some examples, the mapping procedure may be performed using a hash function. In other examples, the program instructions may have a block based instruction set architecture which comprise a plurality of blocks of instructions, and wherein when the branch predictors predict a branch of the instructions, the prediction provides a branch from one of the blocks to another one of the blocks. In further examples, at least one of the branch predictor arrangement may be provided in the processors cores. In some other examples, the branch predictor arrangement may be configured to predict a particular subset of branches in the flow of the program instructions. In still further examples, the branch predictor arrangement may be configured to update each of the at least one processor core with a state information when a prediction is generated regarding a branch of the program instructions that has been mapped to such processor core. In other examples, the prediction is generated using a plurality of branch predictor arrangements.

Disclosed in yet further examples are computer accessible mediums having stored thereon computer executable instructions for at least one branch prediction within a multi-core processor computing system such that when a processing arrangement executes the instructions, the processing arrangement may be configured to map one or more branches of a flow of program instructions to at least one of processor cores in the multi-core processor computing system and generate a prediction regarding a placement of the one or more branches using a branch predictor arrangement. In some examples, the mapping procedure may be performed using a hash function. In other examples, the program instructions may have a block based instruction set architecture which may comprise a plurality of blocks of instructions such that when the branch predictors predict a branch of the instructions, the prediction may provide a branch from one of the blocks to another one of the blocks. In further examples, the branch predictor arrangement is provided in the processors cores. In some other examples, each of the branch predictor arrangement may be configured to predict a particular subset of branches in the flow of the program instructions. In still further examples, the branch predictor arrangement may be configured to update each of the at least one processor core with a state information when a prediction is generated regarding a branch of the program instructions that has been mapped to such processor core.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular devices, methods, systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells, processors and/or cores refers to groups having 1, 2, or 3 cells, processors and/or cores. Similarly, a group having 1-5 cells refers to groups having 1, 2, 3, 4, or 5 cells, processors and/or cores, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A multi-core processor computing system comprising a branch predictor arrangement which is configured to predict a single and complete flow of program instructions associated therewith to be performed on at least a first processor core and a second processor core of a plurality of processor cores of the multi-core processor computing system, wherein each of the first and the second processor cores include at least one distinct branch predictor, wherein the branch predictor arrangement uses a hash function to assign the plurality of branches to the plurality of processor cores, and wherein each of the distinct branch predictors are configured to generate a predicted address and prediction data and provide the prediction data to a selected one of the plurality of processor cores as indicated by the predicted address and the hash function.

2. The computing system of claim 1, wherein the branch predictor arrangement is configured to update at least one core of the plurality of processor cores with a state information when a prediction is generated regarding a branch of the program instructions that has been mapped to the at least one processor core.

3. The computing system of claim 2, wherein the state information comprises a predicted address for the plurality of processor cores and a global history vector.

4. The computing system of claim 3, wherein the state information further comprises a return address stack value.

5. The computing system of claim 1, wherein the program instructions have a block based instruction set architecture which comprise a plurality of blocks of instructions, and wherein when the branch predictors predict a branch of the instructions, the prediction provides a branch from one of the blocks to another one of the blocks.

6. The computing system of claim 5, wherein the predicted branch is selected from a plurality of types of branches using a particular type data.

7. The computing system of claim 1, wherein the branch predictor arrangement is configured to predict a particular subset of branches in the flow of the program instructions.

8. The computing system of claim 1, wherein the branch predictor arrangement is configured to generate the prediction of the flow by using at least one sub-prediction from a local branch predictor and a global branch predictor using a tournament predictor.

9. A method for branch prediction in a multi-core processor computing system comprising:
   mapping a plurality of branches of a flow of program instructions to a plurality of processor cores in the multi-core processor computing system, wherein the mapping is performed using a hash function; and
   generating a prediction regarding a placement of the plurality of branches using a branch predictor arrangement using a first processor core and a second processor core of the plurality of processor cores, wherein each of the first and second processor cores includes at least one distinct branch predictor, wherein the prediction includes a predicted address and prediction data; and
   providing the prediction data to a selected one of the plurality of processor cores as indicated by the predicted address and the hash function.

10. The method of claim 9, wherein the program instructions have a block based instruction set architecture which comprises a plurality of blocks of instructions, and wherein when the branch predictor arrangement predicts a branch of the instructions, the prediction provides a branch from one of the blocks to another one of the blocks.

11. The method of claim 9, wherein the branch predictor arrangement is configured to predict a particular subset of branches in the flow of the program instructions.

12. The method of claim 9, wherein the branch predictor arrangement is configured to update at least one core of the plurality of processor cores with a state information when a prediction is generated regarding a branch of the program instructions that has been mapped to the at least one processor core.

13. The method of claim 9, wherein the prediction is generated using a plurality of branch predictor arrangements.

14. A computer accessible medium having stored thereon computer executable instructions for at least one branch prediction within a multi-core processor computing system, wherein when a processing arrangement executes the instructions, the processing arrangement is configured to:

use a hash function to map a plurality of branches of a flow of program instructions to a plurality of processor cores in the multi-core processor computing system; and generate a prediction regarding a placement of the plurality of branches using a branch predictor arrangement using a first processor core and a second processor core of the plurality of processor cores, wherein each of the first and second processor cores includes at least one distinct branch predictor, wherein the prediction includes a predicted address and prediction data; and provide the prediction data to a selected one of the plurality of processor cores as indicated by the predicted address and the hash function.

15. The computer accessible medium of claim 14, wherein the program instructions have a block based instruction set architecture which comprise a plurality of blocks of instructions, and wherein when the branch predictor arrangement predicts a branch of the instructions, the prediction provides a branch from one of the blocks to another one of the blocks.

* * * * *

UNITED STATES PATENT AND TRADEMARK OFFICE
CERTIFICATE OF CORRECTION

| | | |
|---|---|---|
| PATENT NO. | : 8,127,119 B2 | Page 1 of 1 |
| APPLICATION NO. | : 12/329517 | |
| DATED | : February 28, 2012 | |
| INVENTOR(S) | : Burger et al. | |

It is certified that error appears in the above-identified patent and that said Letters Patent is hereby corrected as shown below:

In the drawings:

In Fig. 1, Sheet 1 of 8, for Tag "103", in Line 1, delete "OPERATNG" and insert -- OPERATING --, therefor.

In Column 2, Line 45, delete "hereof" and insert -- hereof. --, therefor.

Signed and Sealed this
Twenty-fifth Day of September, 2012

David J. Kappos
*Director of the United States Patent and Trademark Office*